March 11, 1969     F. A. KROHM ET AL     3,431,579

WINDSHIELD WIPER ARM AND BLADE ASSEMBLY

Filed Sept. 22, 1966     Sheet 1 of 4

INVENTORS
GEORGE W. RIECKENBERG
FRED A. KROHM

BY

ATTORNEYS

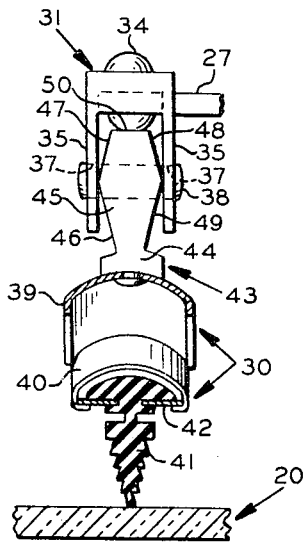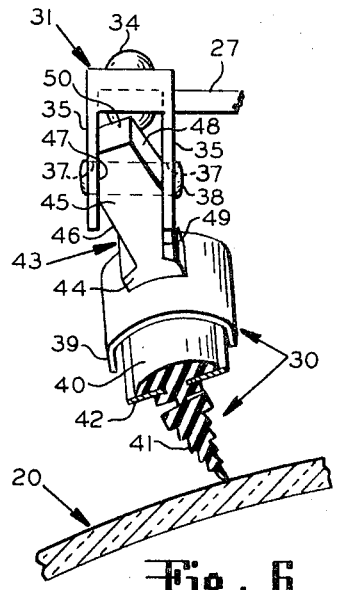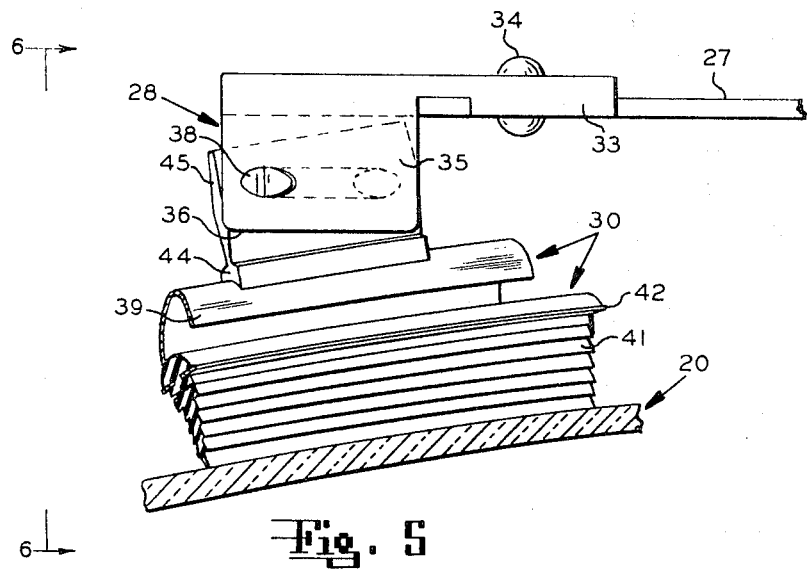

March 11, 1969  F. A. KROHM ET AL  3,431,579
WINDSHIELD WIPER ARM AND BLADE ASSEMBLY
Filed Sept. 22, 1966  Sheet 3 of 4

INVENTORS
GEORGE W. RIECKENBERG
FRED A. KROHM
BY
ATTORNEYS

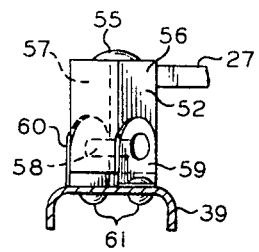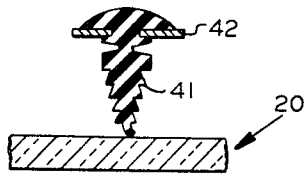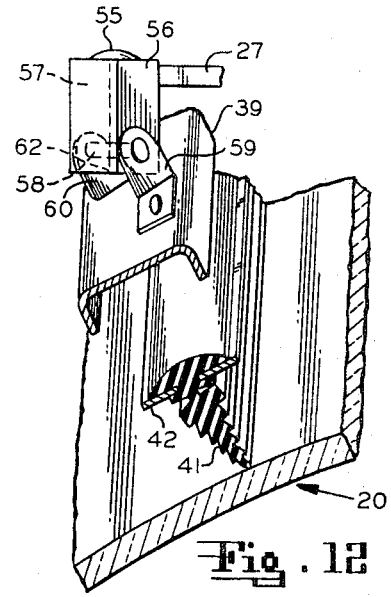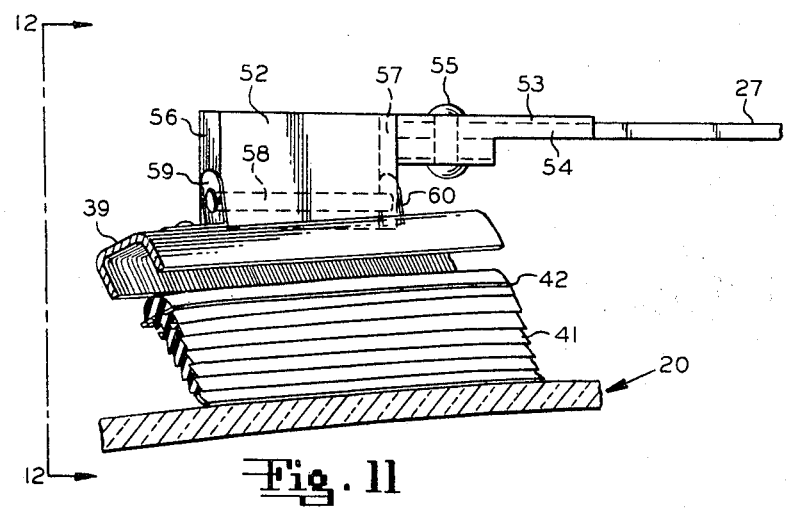

United States Patent Office 3,431,579
Patented Mar. 11, 1969

3,431,579
WINDSHIELD WIPER ARM AND BLADE ASSEMBLY
Fred A. Krohm, Chicago, Ill., and George W. Rieckenberg, St. Paul, Minn., assignors to The Anderson Company, a corporation of Indiana
Continuation-in-part of applications Ser. No. 540,040, Oct. 12, 1955, and Ser. No. 558,724, Jan. 12, 1956. This application Sept. 22, 1966, Ser. No. 582,201
U.S. Cl. 15—250.32  19 Claims
Int. Cl. A47l 1/00; B60s 1/02

ABSTRACT OF THE DISCLOSURE

When wiping windshields of appreciable varying curvature and varying vertical inclination, commonly referred to as "wrap-around" windshields, the wiping element or squeegee of the windshield wiper blade should be maintained in correct or normal attitude to the windshield surface so that the wiping edge of the wiping element lies at the proper angle for optimum wiping. Such action is provided by a windshield wiper blade and wiper arm, which applies pressure to the wiper blade, the blade being connected to the wiper arm by a hinge or pivot, the axis of the pivot being oblique to the longitudinal axis of the blade and lying in a plane substantially normal or perpendicular to the direction of the wiping pressure applied to the blade by the arm.

---

This application is a continuation-in-part of our copending applications, Ser. No. 540,040 filed Oct. 12, 1955, now abandoned, and Ser. No. 558,724 filed Jan. 12, 1956, now abandoned.

The present invention relates to a wiper arm and blade assembly for the wiping of a vehicular windshield or the like. More particularly, this invention pertains to wiping windshield surfaces of varying curvature and to a windshield wiper assembly provided with means for maintaining the wiper blade sufficiently erect to such a windshield surface to insure effective wiping performance.

The present invention is a variant of, and an improvement upon, the basic structure and method disclosed in the pending application of John W. Anderson, Ser. No. 532,640, filed Sept. 6, 1955, now Patent No. 3,316,583.

In the earlier filed Anderson application, there are described the difficulties which are involved in the wiping of windshields of appreciably varying curvature and varying vertical inclination, commonly referred to as "wrap-around" windshields. As there explained, it is necessary to maintain the blade wiping element or squeegee in correct or normal attitude to the windshield surface, so that the wiping edge of the blade lies at the proper squeegee angle for optimum wiping.

The present invention now proposes the utilization of an angularly disposed pivot connection between a windshield wiper arm and a windshield wiping blade to accommodate blade movement relative to the arm about a single axis disposed at an acute angle to the longitudinal axes of the arm and the blade. In order to conform the longitudinally extending blade wiping edge to the windshield surface, movement of the blade relative to the arm is necessary as the arm and blade traverse the varying curved windshield (such movement is referred to herein as a "normalizing" movement). Since all of the relative movement between the arm and the blade is necessarily confined to the single axis, the conforming movement of the blade relative to the arm will cause tilting movement of the blade with respect to the arm.

The degree of tilt required is that which is necessary to maintain the blade in substantially erect position with respect to the windshield glass, and this degree of tilt depends, first, upon the amount of conforming movement necessary to retain the longitudinal wiping edge of the blade in contact with the glass and, secondly, upon the angularity of the pivot axis with respect to the longitudinal axis of the arm and the blade.

It is, therefore, an important object of the present invention to provide an improved, simplified windshield wiper arm and blade assembly, which can be produced economically, for the wiping of a vehicular windshield of irregular curvature.

Another important object is the provision of an improved wiper arm and blade assembly wherein the arm and blade are relatively movable about a single axis which is disposed at an acute angle to the longitudinal axes of the arm and the blade.

It is a further important object to provide an improved windshield wiper arm and blade assembly wherein the conforming movement of the blade to a windshield of varying curvature necessarily affects tilting movement of the blade relative to the arm, the blade and arm being interconnected for movement about a single inclined axis.

It is still another object of the present invention to provide an arm and a blade interconnected about an axis inclined acutely with respect to the longitudinal arm and blade axes in such a manner that as the arm and blade are reciprocated across a windshield of varying curvature, conforming movement of the blade to the glass about said axis causing concurrent and proportional tilting movement of the blade with respect to the arm.

Other objects of the present invention are apparent from the following description of the invention and from the accompanying drawings wherein:

FIGURE 4 is a sectional view taken along the plane 4—4 of FIGURE 3;

FIGURE 5 is a fragmentary sectional view similar to FIGURE 3 taken along the plane 5—5 of FIGURE 1;

FIGURE 6 is a sectional view taken along the plane 6—6 of FIGURE 5, the tilted position of the blade being somewhat exaggerated to facilitate illustration of the relative positions of the parts;

FIGURE 10 is a sectional view taken along the plane 10—10 of FIGURE 9;

FIGURE 11 is a fragmentary section, similar to FIGURE 9 taken along the plane 11—11 of FIGURE 7; and FIGURE 12 is a sectional view taken along the plane 12—12 of FIGURE 11.

Figure 1:
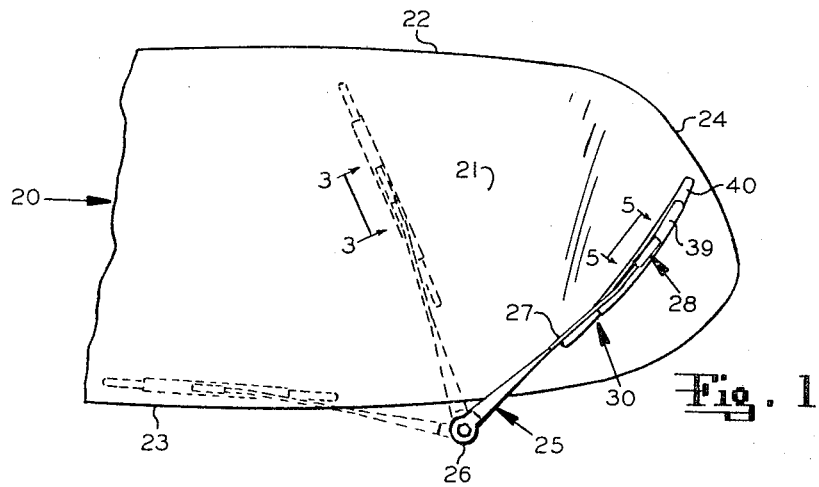
FIGURE 1 is a perspective, somewhat schematic view of a windshield of the "wrap-around" type illustrating a windshield wiper arm and blade of the present invention in three adjusted positions within the wiping pattern.

In FIGURE 1, reference numeral 20 refers generally to a windshield of the "wrap-around" type, only one-half, i.e., the driver's half, of the windshield being shown for clarity of illustration. The surface contour of the windshield exterior surface 21 constitutes the surface to be wiped. The contour of the upper edge 22 of the windshield is determined by the contour of the header portion of the vehicular roof panel, the cowl shape of the vehicle determines the contour of the lower edge 23 of the windshield, and the contour of the upright, front corner post of the vehicle determines the contour of the lateral extremity 24 of the windshield. Windshield 20 has appreciable lateral curvature, and its vertical inclination varies across its lateral extent.

While there is shown and described herewith a particular configuration of windshield, it will be understood that the subject invention is readily adaptable to the efficient wiping of a practically limitless number of windshields of varying configuration, each differing from the illustrated example and from each other.

As shown in FIGURE 1, the windshield wiper system for utilization with the windshield 20 includes an actuating or pivot shaft (not shown) upon which is disposed one end of a windshield wiper arm indicated generally at 25. The lower end of arm 25 is provided with a socket 26, which connects with the end of the pivot shaft. The pivot shaft actuates the arm to oscillate between the various positions indicated in FIGURE 1, all as is well known in the art. The arm 25 at its opposite end has an arm extension 27, generally overlying the surface of the windshield 20 and connection or carrying means, indicated generally at 28, for connecting the arm to a wiper blade, indicated generally by 30.

In accordance with the present invention, connection means 28 includes a bracket 31 formed by stamping or the like. Bracket 31 has a top wall 32 overlying the outer end of the arm and, at its inboard end, depending flanges 33 lying along each side of the end of arm extension 27. Connection means 28 is secured to arm extension 27 by a suitable means, as by a rivet 34. The outer end of the bracket 31 is provided with a pair of laterally spaced elongated, depending flanges or ears 35 which terminate in lower edges 36. The legs 35 are apertured as at 37 (FIGURES 4 and 6) to receive therethrough a pivot pin, shaft, rivet, or similar pivot member 38.

The blade 30 is preferably of the type illustrated in Patent No. 2,596,063 to John W. Anderson, the blade including a central bridge member 39 and secondary bridge members 40 which are interconnected, the secondary bridge members being connected to the resilient wiper element 41 through a resiliently flexible support element 42.

The central or primary bridge 39 is provided with an upstanding projection indicated generally at 43 and best illustrated in FIGURES 4 and 6. The projection 43 is fixed to the central bridge 39 by suitable means, as by staking, riveting, or the like.

Figure 2:
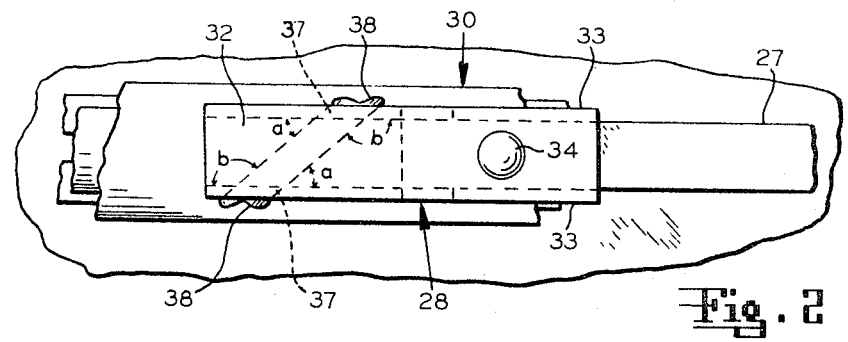
FIGURE 2 is a fragmentary, enlarged plan view of the connection of the arm and blade of FIGURE 1.

The upstanding projection 43 has a base portion 44 whose lower surface is contoured to snugly abut the upper arcuate surface of the bridge 39, and an upstanding or upper portion 45 adapted to be received by and projecting between the legs 35 of the connector bracket 31. Upper portion 45 is provided with an angularly disposed aperture through which the pin 38 extends and with tapered side walls which have generally concave side surfaces formed by planar surfaces 46, 47, 48 and 49. The ends of pin 38 are preferably distorted as indicated in FIGURE 2 to lock the pin in place. The surfaces 46 and 48 are parallel, and the surfaces 47 and 49 are parallel to provide stop surfaces, as will be later described in detail. The projection terminates in an upper or top wall 50 which is spaced vertically a substantial distance beneath the adjacent inner surface of the bracket 31.

Figure 3:
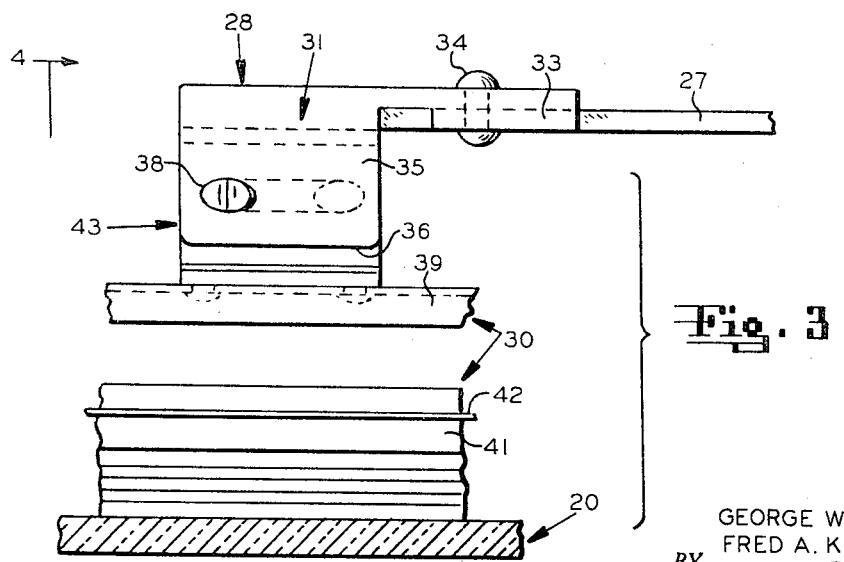
FIGURE 3 is a fragmentary, enlarged side view of the arm and blade connection of FIGURE 2 taken along the plane 3—3 of FIGURE 1.
Figure 7:
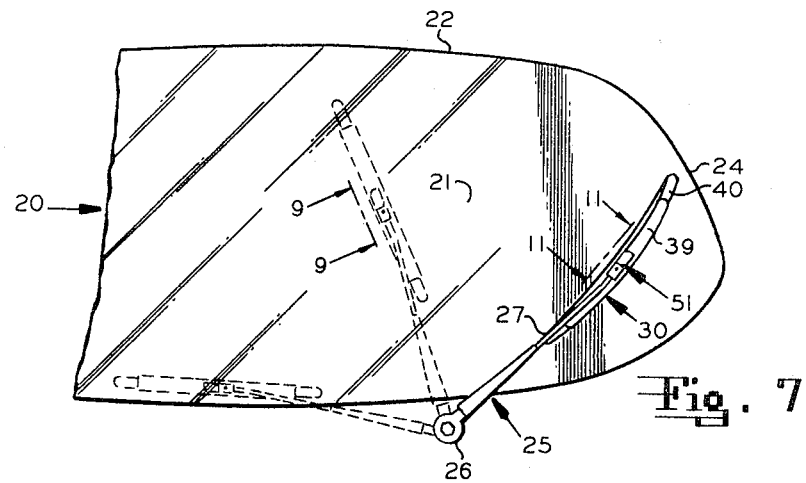
FIGURE 7 is similar to FIGURE 1 but illustrates another embodiment of the present invention.

It will be noted from FIGURES 2, 3 and 5 that the pin 38 is angularly disposed with respect to the arm and the blade. More specifically, the pin 38 lies at an acute angle with respect to the medial vertical longitudinal axis of the arm, neglecting the usual parking offset of the arm, and to the longitudinal plane of the blade (i.e., the axis of pin 38 in oblique to the longitudinal blade axis and lies in a plane substantially normal to the direction of wiping pressure). This acute angle is illustrated at *a* in FIGURE 2, with the reference character *b* indicating the complementary angle which, of course, is obtuse. The term "acute angle" is utilized to distinguish between the present invention and certain prior art connectors in which the connection between the arm and the blade includes a connecting pivot lying normal to or at right angles to the longitudinal planes of the arm and the blade, or which lie in or parallel to these longitudinal planes.

The operation of the device of the present invention is quite simple, and relies upon the fact that the inclined pivot pin 38 is utilized to accommodate that movement between the arm and blade which is necessary for the blade wiping edge to longitudinally conform to the windshield. As the arm and blade are oscillated across the surface of the windshield 20, the relative vertical inclination of the windshield with respect to the arm changes and the blade necessarily conforms to the windshield surface because of arm pressure so that the longitudinal wiping edge of the blade remains in constant and full length contact with the windshield. Thus, there is a varying angular relationship between the arm and the blade as these elements traverse the windshield surface.

Because of the angularity of the pivot pin 38, this conforming movement occurs about an axis which is inclined or angularly disposed with respect to the longitudinal axis of the arm, and this angularity of the sole axis of relative arm-to-blade movement causes the blade to tilt relative to the arm, as best seen in FIGURES 5 and 6. (The tilting movement may, if desired, be limited by abutment of the surfaces 46 and 48, and 47 and 49, with the inner surfaces of the legs 35.)

In FIGURES 7 through 12, which illustrate another embodiment of the invention, some of the elements or parts shown therein correspond substantially in construction and/or function to elements or parts in FIGURES 1 through 6 and, therefore, need not be described again. Such elements or parts have been given numbers identical to the corresponding parts or elements of FIGURES 1 through 6.

Figure 8:
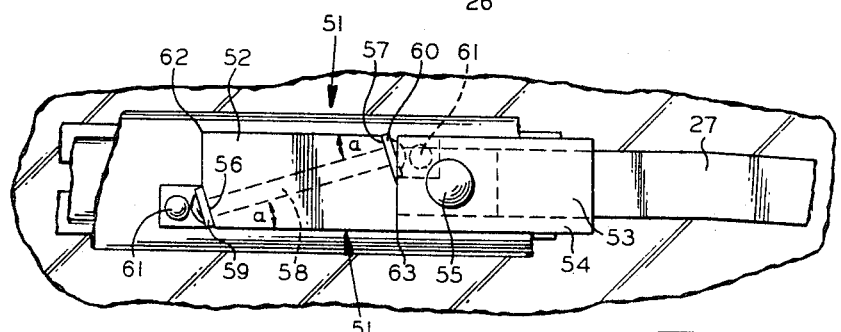
FIGURE 8 is a fragmentary, enlarged plan view of the arm and blade of FIGURE 7 and shows the connecting means therefor.

In accordance with the present invention, connecting means, indicated generally by 51, includes a bearing element or block 52 suitably attached to the arm extension 27. For example, a sleeve 53 may extend from the bearing block to receive the arm extension and have depending flanges 54 which fold down along the sides of the arm and lap one another under the arm. A rivet 55 secures the attachment. Bearing block 52 may be solid but is preferably hollow to facilitate manufacture as by stamping. In any case, the bearing block has opposed faces 56 and 57 which are offset or angularly related to the general longitudinal direction of the arm 25 and connecting means 51. As shown in FIGURE 8, the opposing faces 56 and 57 are conveniently located at opposite corners of the bearing block 52. The opposing or offset faces 56 and 57 have openings if the block is hollow or the block is provided with a cylindrical passage if solid to accommodate a pivot pin 58 for a purpose hereinafter described.

The central or primary bridge 39 of blade 30 has a pair of upstanding ears or L-shaped lugs 59 and 60. Rivets 61 secure one wing of each lug to the primary bridge, while the other wind extends upwardly and in substantial parallelism with one of the offset faces 56 and 57. Accordingly, the upstanding wing of each lug may be skewed or offset with respect to the other wing as shown in FIGURE 8. Each of the upstanding wings is apertured to receive the pivot pin 58 which may be hammered over at its ends to prevent its removal and subsequent disassembly of the arm and blade. As shown particularly in FIGURE 9, by pivotally engaging the pivot pin 58, the lugs 59 and 60 support the bearing block 52 about and normally out of contact with the primary bridge 39.

Figure 9:
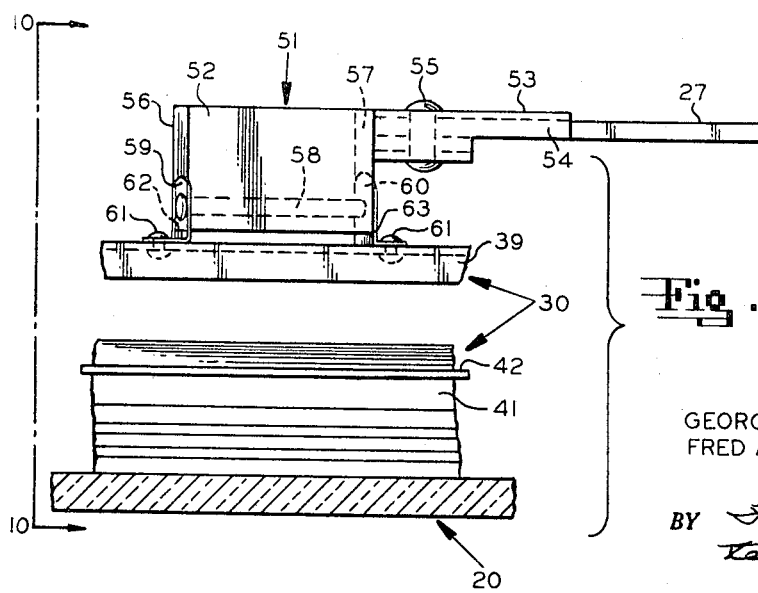
FIGURE 9 is a fragmentary, enlarged side view of the connecting means of FIGURE 8 taken along the plane 9—9 of FIGURE 7.

The pivot pin 58 is angularly disposed with respect to the arm and blade as illustrated in FIGURES 8, 9 and 12. More specifically, the pin 58 lies at an acute angle with respect to the medial vertical longitudinal axis of the arm, neglecting the usual parking offset of the arm, and to the longitudinal plane of the blade. This acute angle is illustrated at *a* in FIGURE 8.

The operation of the device of FIGURES 8 through 12 relies upon the ability of the inclined pivot pin 58 to accommodate that movement between the arm and blade which is necessary for the blade wiping edge to longitudinally conform to the windshield in the same manner as pivot pin 37 shown in FIGURES 2 through 5.

The tilting movement of the blade may, if desired, be limited by the abutment of the corners 62 and 63 of the bearing block against the primary bridge 39. Ordinarily, abutments or stops as represented by the corners 62 and 63 need be used only if the desired amount of relative pivoting between the arm and the blade is to be less than the realtive pivoting engendered by the movement of the blade across a curved windshield.

Thus, the present invention provides an improved arm and blade assembly wherein the arm and blade are intreconnected for tilting movement about a single axis defined by pivot pin 37 or 58 which lies at an acute angle to the longitudinal axis of the arm 25 and in a plane that is substantially normal to the direction of wiping pressure on the windshield. This angular relationship of pin 37 or 58 causes concurrent and proportional conforming and tilting movement of the blade relative to the arm. The tilting movement of the blade, which occurs as a consequence of blade conforming movement, causes the blade to remain substantially erect or in the proper or normal wiping attitude to the curved glass surface.

It will, of course, be understood that various details of construction may be varied through a wide range without departing from the principles of this invention, and it is, therefore, not the purpose to limit the patent granted herein otherwise than necessitated by the scope of the appended claims.

We claim:

1. A windshield wiper arm and blade assembly comprising an oscillatable wiper arm having at one end a bearing member, a wiper blade having fixed upstanding projections adapted to receive the bearing member therebetween, and a pivot pin joining said bearing member and upstanding projections for relative pivotal movement; said pin having an axis disposed at an oblique angle to the longitudinal axis of said blade and effecting normalizing movement of the blade relative to the windshield when the blade is directed on the windshield by the arm.

2. In a windshield wiper arm and blade assembly, the improvements which comprise nested and interconnected elements formed on said arm and blade, respectively, and pivot means passing through said nested elements and forming the sole connection between said arm and blade and accommodating blade-to-arm movement about a single axis disposed at an oblique angle to the longitudinal axis of the blade.

3. A windshield wiper arm and blade assembly comprising an oscillatable wiper arm, a wiper blade adapted to be secured to the arm, and a pivot pin traversing adjacent portions of said arm and said blade and lying at an oblique angle to the longitudinal axis of said blade for effecting normalizing movement of the blade relative to the windshield when the blade is moved on a windshield by the arm.

4. A windshield wiper assembly including an arm having a bearing element adjacent one end, said element having opposed faces disposed at an oblique angle with respect to the longitudinal axis of the element, a wiper blade having upstanding lug members to receive the bearing element therebetween, each lug member being contiguous to one of said opposed faces, and a pivot extending through the lugs and through the bearing element at a right angle with respect to the plane of said opposed faces to permit relative pivotal movement between the arm and blade and effect normalizing movement of the blade relative to the windshield about said pivot when the blade is moved on the surface of a windshield by the arm.

5. In a windshield wiper blade and arm assembly, an arm adapted to apply pressure to the blade and having a head adapted to receive and be driven by a pivot shaft activated by a windshield wiper motor or the like, extension means having a hingelike connection with said head and adapted, adjacent its outer extremity, to be connected to a windshield wiper blade; a windshield wiper blade having a hinge-like connection with said extension, pivot shaft means associated with one of said connections with its axis obliquely disposed with relation to the longitudinal axis of the blade whereby to cause said blade to maintain a substantially erect position with relation to a windshield of varying curvature when said blade is moved across the windshield by the arm.

6. In combination: a windshield, driven means disposed adjacent the windshield, a spring-pressed wiper arm having an inner end attached to the driven means and also having an outer end, a wiper blade, and means connecting the blade to the outer end of the arm for establishing relative movement between the arm and blade about an axis disposed at an oblique angle to the longitudinal axis of the blade to cause the blade to tilt relative to the arm and thereby maintain the blade normal to the windshield when moved thereon by the arm.

7. In a windshield wiper organization, an elongated wiper blade, a wiper arm for applying wiping pressure to said wiper blade, and hinge means for connecting said wiper blade to said wiper arm, the axis of said hinge means being oblique to the longitudinal blade axis and lying in a plane substantially normal to the direction of wiping pressure applied to said blade by said arm.

8. A windshield wiper assembly including a springurged arm having spaced-apart flange portions, an elongate wiping element having a projection adapted to fit between said portions, and pivot means interconnecting the projection and flange portions for relative movement about an axis disposed at an acute angle to the longitudinal axis of the element and in a plane transverse to a line of force exertable by the arm.

9. A wiper assembly for a curved windshield including an oscillatable spring-urged arm having laterally spaced legs, a wiping blade having an upstanding projection stationed between the legs, and a pivot interconnecting the legs and projection for relative pivoting thereabout, said pivot lying at an acute angle to the vertical longitudinal axis of the blade, and in a plane transverse to a line of force exertable by the arm for effecting normalizing movement of the blade as the arm traverses the curved windshield, and means to limit the relative pivoting of the legs and projection about said pivot.

10. A wiper assembly for a variantly curved windshield including a spring-urged arm member adapted to be oscillated adjacent one end, a wiper blade member, one of said members having laterally spaced wall portions and the other of said members having a projection provided with tapered sides and extending between the wall portions to dispose the tapered sides opposite to the wall portions, a pivot journalling the wall portions and projection for relative rotation about the pivot, said pivot being disposed transverse to a line of force exertable by the arm member and defining an acute angle with the longitudinal axis of the blade to tilt the blade member relatively to the arm member and maintain the former in an effective wiping posture with respect to the variantly curved windshield, said tapered sides limiting the relative pivoting of the blade and arm members about the pivot by engaging said wall portions.

11. A wiper assembly as claimed in claim 10 wherein the arm member has the laterally spaced wall portions the blade member has the projection which extends outwardly from a back thereof, the projection has its largest lateral dimension adjacent a medial portion, the tapered sides of the projection comprise substantially planar surfaces intersecting adjacent said medial portion, and the planar surfaces engage the wall portions to limit the relative pivoting of the blade and arm members about the pivot.

12. A windshield wiper assembly including a spring-urged arm unit and an elongate resiliently flexible wiping unit, one of said units having spaced-apart portions and the other unit having a projection disposed between said portions, and means interconnecting the projection and said portions for relative motion about an axis disposed at an acute angle to the longitudinal axes of the arm unit and wiping unit and in a plane transverse to a line of force exertable by said arm unit.

13. A windshield wiper assembly including a spring-urged arm unit and an elongate resiliently flexible blade unit, one of said units having spaced-apart portions and the other unit having means disposed between said portions, and means connecting the disposed means and said portions for relative movement about an axis arranged at an oblique angle to the longitudinal axis of the blade unit and disposed in a plane transverse to a line of force exertable by the arm unit.

14. An elongate windshield wiper blade provided with an element, a spring-urged wiper arm provided with an element, and means pivotally connecting the elements disposed at an oblique angle to the longitudinal axis of the blade and in a plane transverse to a line of force exertable by the wiper arm.

15. An elongate windshield wiper blade and a spring-urged wiper arm, and means operatively connecting the blade and arm for relative movement about an axis disposed at an oblique angle to the longitudinal axis of the blade and in a plane transverse to a line of force exertable by the arm.

16. Windshield cleaning apparatus for wiping a curved windshield surface having a frontal portion and a wrap-around portion, comprising an arm having pivotally interconnected inner and outer sections, means for imparting oscillation to said arm throughout a predetermined stroke, resilient means interconnecting the inner and outer arm sections for urging the outer arm section towards the windshield, a wiper blade, and means interconnecting the wiper blade and the outer arm section including a hinge pin having an axis located oblique to the longitudinal axis of the blade, said axis lying in a plane parallel to the major plane of the frontal portion of said windshield surface.

17. Windshield cleaning apparatus including, a wiper arm having pivotally interconnected inner and outer sections, resilient means engaging said outer arm section for urging said outer arm section towards the windshield, a wiper blade, and means interconnecting the wiper blade and the outer arm section including a hinge pin having an axis located oblique to the longitudinal axis of the blade and lying in a plane substantially normal to the direction of wiping pressure applied to said blade by the outer section of said arm.

18. In a windshield wiper organization, means for connecting a wiper blade to a wiper arm, said wiper arm applying wiping pressure to said wiper blade, including, hinge means interconnecting the wiper blade and the wiper arm, the axis of said hinge means being oblique to the longitudinal blade axis and lying in a plane substantially normal to the direction of wiping pressure applied to said blade by said arm.

19. Cleaning apparatus for a curved windshield surface including, an oscillatory wiper arm having spring hinge connected inner and outer sections, a wiper blade and a normalizing hinge connection between the outer arm section and the wiper blade to maintain the wiper blade substantially normal to the surface being cleaned as the outer arm section follows the curvature of said windshield during oscillatory movement thereof, the axis of said normalizing hinge connection being oblique to the longitudinal axis of the blade and lying in a plane substantially normal to the direction of wiping pressure applied to said wiper blade by the outer section of said wiper arm.

References Cited
UNITED STATES PATENTS 3,061,865 11/1962 Krohm _____ 15—250.23
3,180,757 4/1965 Wise _____ 15—250.32 X PETER FELDMAN, *Primary Examiner.*